(12) United States Patent
Hauber

(10) Patent No.: US 6,773,773 B2
(45) Date of Patent: Aug. 10, 2004

(54) REINFORCED THERMOPLASTIC PIPE MANUFACTURE

(75) Inventor: David Edgar Hauber, Troy, NY (US)

(73) Assignee: ADC Acquisition Company, Schenectady, NY (US)

( * ) Notice: Subject to any disclaimer, the term of this patent is extended or adjusted under 35 U.S.C. 154(b) by 25 days.

(21) Appl. No.: 09/332,420

(22) Filed: Jun. 14, 1999

(65) Prior Publication Data

US 2002/0054968 A1 May 9, 2002

(51) Int. Cl.[7] .................................................. B32B 1/08
(52) U.S. Cl. ................... 428/34.4; 428/84.1; 428/34.5; 428/34.6; 428/34.7; 428/35.7; 428/36.3; 428/36.9; 428/36.91; 138/172; 138/174
(58) Field of Search ............................... 428/34.1, 34.4, 428/34.5, 34.6, 34.7, 36.3, 36.9, 36.91; 138/172, 174; 156/166, 172, 173

(56) References Cited

U.S. PATENT DOCUMENTS

| | | | | |
|---|---|---|---|---|
| 4,343,333 A | * | 8/1982 | Keister ........................ | 138/125 |
| 4,431,034 A | * | 2/1984 | Abdullaev et al. .......... | 138/130 |
| H1261 H | * | 12/1993 | Gibson et al. ............... | 156/169 |

* cited by examiner

Primary Examiner—Sandra M. Nolan
Assistant Examiner—Alicia Chevalier
(74) Attorney, Agent, or Firm—John F. McDevitt

(57) ABSTRACT

A fiber reinforced thermoplastic pipe member is obtained by a novel continuous process in which the reinforcement fibers are wrapped about the outer pipe surface in an unbonded condition while the pipe member continuously moves in a linear direction and which is followed by sufficient heating of the moving fiber wrapped pipe member to cause thermal bonding between the applied fibers and the pipe member. Automated apparatus for carrying out the continuous process is also disclosed.

5 Claims, 2 Drawing Sheets

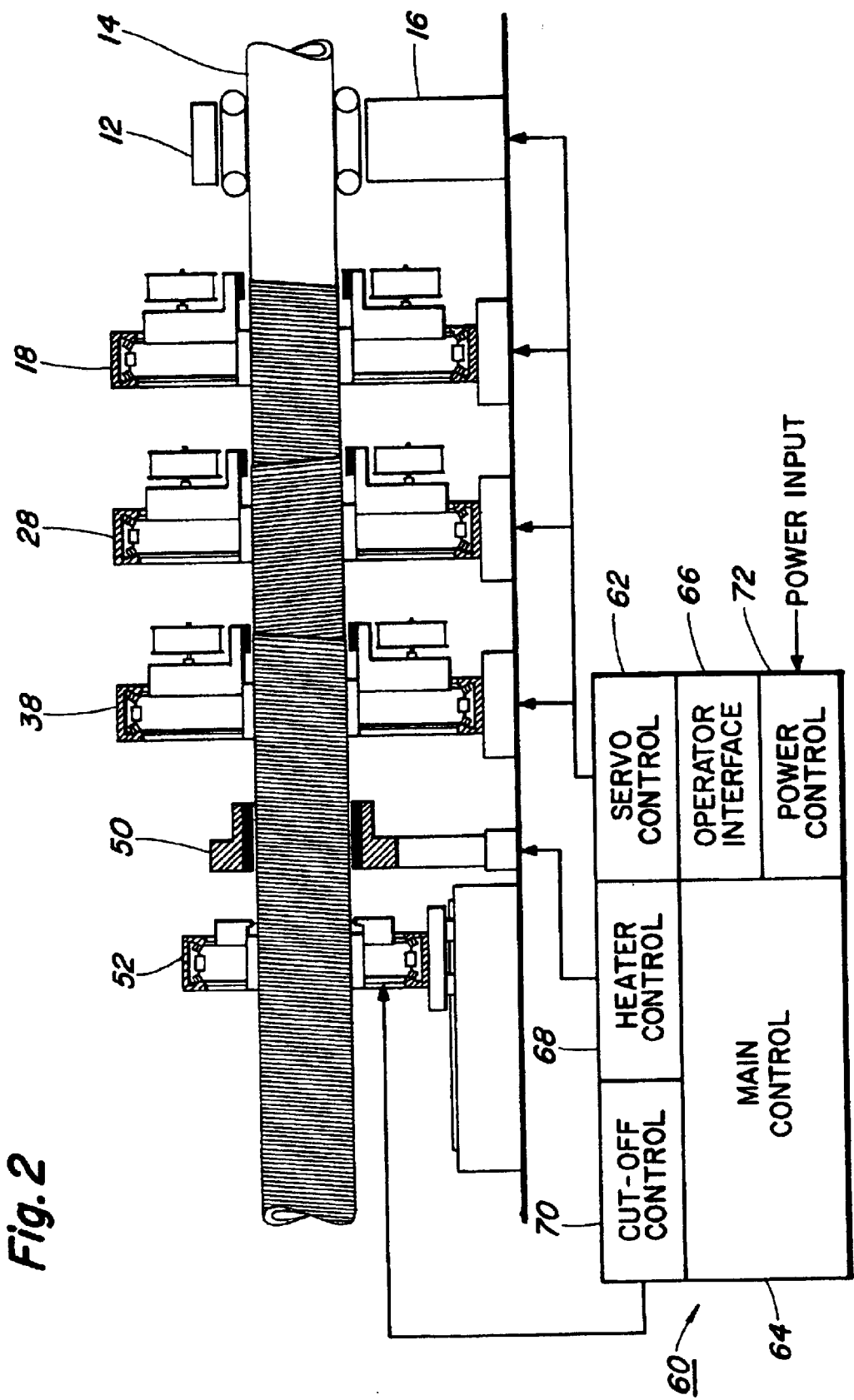

REINFORCED THERMOPLASTIC PIPE MANUFACTURE

BACKGROUND OF THE INVENTION

This invention relates generally to the manufacture of fiber reinforced thermoplastic pipe lengths and more particularly to a novel continuous processing means for the manufacture of these articles.

The fiber reinforcement of pipe members formed with both thermoset and thermoplastic organic polymers has already gained wide commercial acceptance attributable to affording high strength and stiffness per unit weight when compared to pipe fabrication with the conventional materials previously used for transporting various fluids such as concrete, steel and the like. A variety of fabrication procedures are also well known to produce the composite pipe member with continuous fiber filaments which are commonly applied to the outer pipe surface. In one example, a tension winding process is commercially employed whereby a thermoplastic pipe or coupler member is rotated on a mandrel while the reinforcing fiber is being applied under heat and tension. The fiber tension during winding or wrapping around the underlying thermoplastic member provides a compaction force therebetween to secure thermal bonding of the fibers after the heating has melted or softened the outer surface of the thermoplastic material. This process has been found limited to relatively high fiber angles with respect to the longitudinal axis of the pipe or coupler member, typically greater than 15 degrees because the radial component of the fiber tension provides this compaction force. While tension winding can be augmented with a use of compaction roller means to increase the radial compaction force, the resulting low fiber angles produce undesirable fiber build-up at the mandrel ends since the continuous fibers being applied cannot be cut for a restart of the filament winding process. A further need to apply relatively high pressure as well as provide mandrel rotation during said tension winding process requires robust and expensive mandrels together with significant mandrel handling labor. In a different manufacturing process for the production of reinforced plastic pipe members, continuous glass fibers in a thermoset epoxy matrix are employed. Still other manufacturers produce a reinforced thermoplastic pipe construction having the thermoplastic pipe member as an innerlayer which is surrounded by various outerlayers of the reinforcement material. For example, one such manufacturer surrounds the thermoplastic liner with a fiberglass layer in an epoxy resin matrix and provides an exterior protective layer thereover of a still different fiber material which is again contained in an organic polymer matrix. Using thermoset polymers in the reinforcement of a thermoplastic pipe member frequently creates additional manufacturing problems. The curing required of these polymers occasions contamination as well as time delay and these materials are not recyclable.

Another complex reinforced thermoplastic pipe construction is disclosed in U.S. Pat. No. 4,850,395. As therein described, a core member of thermoplastic material is wound with an inner aramid fiber layer while being covered with still additional tape and metal outer layers. Such end product is understandably found to be both cumbersome and expensive to manufacture. In U.S. Pat. No. 4,469,138 there is disclosed polypropylene pipe lengths reinforced by simply mixing discrete carbon fibers in the starting polymer composition. The resulting product lacks the mechanical strength afforded with continuous fiber reinforcement as well as lacks the ability to orient continuous fibers in a predetermined spatial direction for maximum effectiveness in withstanding applied stress when the pipe member is in service. In the latter regard, such controlled directional orientation of the continuous fiber component in the reinforced thermoplastic pipe member enables the fiber placement to be fixed for such maximum effectiveness since the fiber materials being employed are generally stronger than the thermoplastic polymers forming the pipe member. The fiber reinforced end product is thereby only as strong as the spatial direction of the applied fibers with respect to the direction of the external stress when applied to said reinforced pipe member. Thus, when the fiber reinforced pipe member is stressed by internal fluid pressures in the direction of the fiber placement, the applied load is withstood primarily by the included fibers and the strength of said pipe member is at maximum value. Conversely, when the composite member is stressed in a perpendicular direction to the fiber direction, the applied force must necessarily be resisted primarily by the polymer pipe member so that pipe strength is at a minimum. From such consideration and a further analysis of the expected stress during pipe service employing recognized shell theory calculations, it has been determined that certain installations of the present fiber reinforced thermoplastic pipe members dictate a fiber orientation in the hoop direction whereas dissimilar pipe installations require the fiber direction to be oriented at lesser angles with respect to the longitudinal axis of the reinforced pipe member.

A still more arduous method for reinforcement of a thermoplastic pipe member is disclosed in U.S. Pat. No. 4,347,090 which employs a fabric sleeve applied about the pipe member for this purpose. The method requires an inner liner to be filled with liquid which is then heated causing said liner to expand as well as become partially molten for thermal bonding to an overlying glass fabric layer. An outermost layer comprising a thermoset resin impregnated glass cloth completes the reinforcement. Such final product and its method of fabrication are understandably both complex and expensive.

In U.S. Pat. No. 4,770,442 there is also disclosed a rather complex electrofusion type coupler being employed to join synthetic resin pipe lengths together. Said coupler member employs a cylindrical thermoplastic sleeve which includes a metal heating wire being disposed adjacent the inside surface while being reinforced on the outside surface with a winding or covering formed with a material composition exhibiting a lower thermal expansion than that of the thermoplastic sleeve material. Such reinforcement is said to limit any outward radial expansion of the composite sleeve during subsequent thermal bonding of said member to the pipe lengths being joined together by this means.

It is an important object of the present invention, therefore, to provide a more effective means for the fiber reinforcement of a thermoplastic pipe member in a continuous manner.

It is another important object of the present invention to provide a novel fiber reinforced thermoplastic pipe member having the fiber placement physically incorporated therein so as to better resist the applied stress encountered during use in a significantly improved manner.

Still another important object of the present invention is to provide a novel method for continuous fabrication of a fiber reinforced thermoplastic pipe member.

A still further important object of the present invention is to provide novel apparatus means for the continuous fabrication of a fiber reinforced thermoplastic pipe member.

These and still further objects of the present invention will become more apparent upon considering the following more detailed description of the present invention.

SUMMARY OF THE INVENTION

It has been discovered, surprisingly, that fiber reinforcement of a thermoplastic pipe length can be carried out more effectively in a continuous manner by reversing the customary relative rotation between the fiber when applied and the pipe member. More particularly, the processing procedure of the present invention continuously moves the pipe length in a linear direction without rotation while wrapping a plurality of continuous juxtapositioned reinforcement fibers formed with a material composition selected from the group consisting of ceramics, metals, carbon and organic polymers in an unbonded condition about the outer surface of said moving pipe member in a predetermined spatial direction and thereafter heating the fiber wrapped pipe length sufficiently to cause thermal bonding between the reinforcement fibers and the pipe outer surface while said fiber wrapped pipe length continues to move in the same linear direction. To impart increased mechanical strength for said fiber reinforcement requires that the fiber placement be carried out with the fibers being oriented in a particular spatial direction depending upon end use of the wrapped pipe length as previously pointed out herein. In accordance therewith, the fibers can be wrapped in a hoop direction about the pipe length as well as wrapped at lesser or interim angles with respect to the longitudinal axis of said pipe length. Additionally, multiple wraps of the reinforcement fibers can be applied continuously in accordance with the present processing procedure to include one or more overwraps being applied to serve as a protective covering from exposure of the final product to environmental or mechanical damage. Likewise, having the individual fiber wraps applied continuously in different spatial directions is contemplated in accordance with the present processing procedure and with the individual wraps all being bonded to the underlying thermoplastic pipe member after placement with a single heating step. The present processing procedure can similarly be carried out with multiple pipe lengths that have been joined together at the pipe ends in an in-line configuration before continuous fiber placement by employing conventional means such as butt-welding, adhesive bonding and the like as well as possibly being joined together with only a physical abutment existing therebetween. Suitable thermoplastic organic polymer materials forming the pipe member in the present composition construction include but are not limited to polyethylene such as high density polyethylene and medium density polyethylene, polypropylene, polyphenylene sulfide, polyetherketoneketone, polyamide, polyamideimide, and polvinylidene difloride. Similarly, a wide variety of materials are found suitable as the fiber reinforcement in the present processing procedure to again include but not be limited to ceramics, metals, carbon, aramid and other polymer fibers having softening temperatures above that of the pipe service temperature in use and glass compositions such as E type and S type glass.

Basically, the present thermal bonding of continuous fibers after having been wrapped in an unbonded condition about the outer periphery of the thermoplastic pipe length or lengths involves an operative cooperation between the applied fibers and the outer surface of said pipe member. A softening or melting action takes place during the thermal bonding step between the outer surface of the thermoplastic pipe member and any thermoplastic polymer materials serving as the matrix composition in selected preformed tape embodiments having the continuous reinforcement fibers bonded therein. In this manner, the applied fibers become physically joined to the pipe member with softened or melted thermoplastic polymer when the fiber wrapped pipe member is heated in the present method such as occurs when melting said outer pipe surface. The present heating step also produces a significant radial expansion of the pipe member upon heating which further promotes the physical adherence of the applied fibers to the outer pipe surface. In so doing, a radial compaction or compressive force is generated in the joined components with the maximum benefit being imparted by having the coefficient of thermal expansion for the selected fiber material being lower than that for the thermoplastic pipe polymer. The herein defined fiber reinforcement method understandably enables a wide variety of fiber materials to be selected as previously pointed out. Thus, a reinforcement fiber material can be selected from the aforementioned class of suitable materials so long as it is mechanically stiffer than the selected thermoplastic pipe polymer and has a glass transition or melting temperature higher than the service temperature of the thermoplastic pipe member during use. Selected polymer fibers can understandably include continuous bare filaments and comingled continuous fibers which can be wetted by polymer melt flow in the above mentioned compaction zone during heating. For selection of a suitable preformed continuous fiber material or prepreg tape having a matrix formed with a thermoplastic polymer, said matrix polymer is desirably chosen to have a softening or melt temperature equal to or lower than the softening temperature of the selected pipe polymer.

Any suitable heating source can be used in the present method to continuously bond the applied fiber reinforcement to the outer thermoplastic pipe surface. Contemplated heat sources include but are not limited to inert gases, oxidizing gases and reducing gases, including mixtures thereof, infrared heating sources, such as infrared panels and focused infrared means, conduction heating sources such as heated rollers, belts and shoe devices, electrical resistance heating sources, laser heating sources, microwave heating sources, RF heating sources, plasma heating sources and ultrasonic heating sources. An external flame heat source provides economical heating with high energy densities and with the gas burner or burners being suitably designed so as to surround the outer circumference of the fiber wrapped thermoplastic pipe member. Understandably, the employment of a continuous heating step in the present method can further advise auxiliary equipment means to be operatively associated therewith in the event of process interruptions such as fast responsive heating devices or cooling means averting meltdown of the materials being processed. It is also contemplated that the present method of thermally bonding the applied reinforcement fibers continuously to the outer surface of said thermoplastic pipe member can be modified in a still further manner. Accordingly, roller members rotatably mounted so as to press against the already heated fiber wrapped thermoplastic pipe member can be employed to help generate the aforementioned compaction force found beneficial in carrying out the present method. Such compaction rollers can be cooled, heated or remain at ambient temperatures in the present method depending upon the process requirements being carried out as well as the physical characteristics desired in the final product.

As above indicated, the present continuous method necessarily further includes provision being made for both start-up as well as termination and possible process interruption. Satisfactory start-up of the present processing procedure can be conducted in various ways to include starting with a single thermoplastic pipe length or multiple pipe lengths and feeding these members with continuous linear motion at a relative constant velocity to suitable fiber winding means. A continuous thermoplastic pipe length can be suitably provided employing conventional extruder means while the feeding of discrete pipe lengths to the operatively associated fiber winding means can preliminarily involve having the discrete pipe lengths simply butted together physically in an in-line configuration as well as having the respective pipe ends fused or welded to each other. Conventional means can be employed for continuous transport of the thermoplastic pipe member during processing in said manner including known moving belt drive mechanisms and motor driven rollers. Suitable start-up would also optionally include having the initial continuous fiber being physically secured to the outer surface of the first moving thermoplastic pipe member being processed with conventional clamping or adhesive bonding means. Following a continuous thermal bonding of the applied reinforcement fibers in the manner previously described, the present method can be terminated with conventional cut-off means being employed to suspend any further fiber placement. Satisfactory cut-off means can utilize a moving cutter device traveling in the same linear direction as the moving pipe member or members and to include a cutter severing the pipe along with the applied fiber reinforcement.

Novel apparatus means are employed to provide continuous fabrication of the present fiber reinforced thermoplastic pipe member. Basically, the present apparatus employs pipe feeding means which continuously transports the pipe length in a linear travel direction for operative association with rotating fiber supply means, fiber supply means which rotate about the circumference of said moving pipe length to continuously apply a plurality of juxtapositioned reinforced fiber wraps in a predetermined spatial direction on the outer surface of said moving pipe length, and heating means which causes thermal bonding to be continuously formed between the applied reinforcement fiber wraps and the outer surface of the moving pipe length. Said apparatus can further include a plurality of individual fiber supply means to serve various purposes such as applying successive fiber wraps at different fiber placement angles, reversing the application direction of successive fiber wraps, and applying overwraps of continuous fiber or tape material to serve as a protective covering against environmental or mechanical damage to the final product. A satisfactory embodiment for said individual fiber supply means can be a conventional cylindrical winder mechanism operatively associated with a rotary fiber or tape spool. The pipe feeding means in the present apparatus can also be of conventional construction, as previously pointed out, to include known moving belt drive mechanisms as well as motor driven rollers and the like. While a further previously mentioned wide variety of heating sources can be employed in the present apparatus for continuous thermal bonding of the applied fiber or tape wraps, it remains advisable for the selected heat source to uniformly provide heat about the entire circumference of the fiber wrapped pipe length in doing so. In the apparatus embodiments to be more fully described hereinafter, the particular heating means being employed consists of a stationary cylindrically shaped heater that surrounds the entire circumference of the fiber wrapped pipe member and which is equipped with appropriately disposed internal gas burners. Moving cutter means are also employed in the illustrated apparatus embodiments for the purpose of severing the moving fiber wrapped pipe member into one or more suitable lengths upon completion of the herein described thermal bonding procedure. The entire apparatus in said illustrated embodiments is further operated automatically with known robotic control means employing a conventional velocity servomechanism system.

BRIEF DESCRIPTION OF THE DRAWINGS

FIG. 2 schematically depicts representative automatic control means for the FIG. 1 processing equipment.

DETAILED DESCRIPTION OF THE PREFERRED EMBODIMENTS

Figure 1:
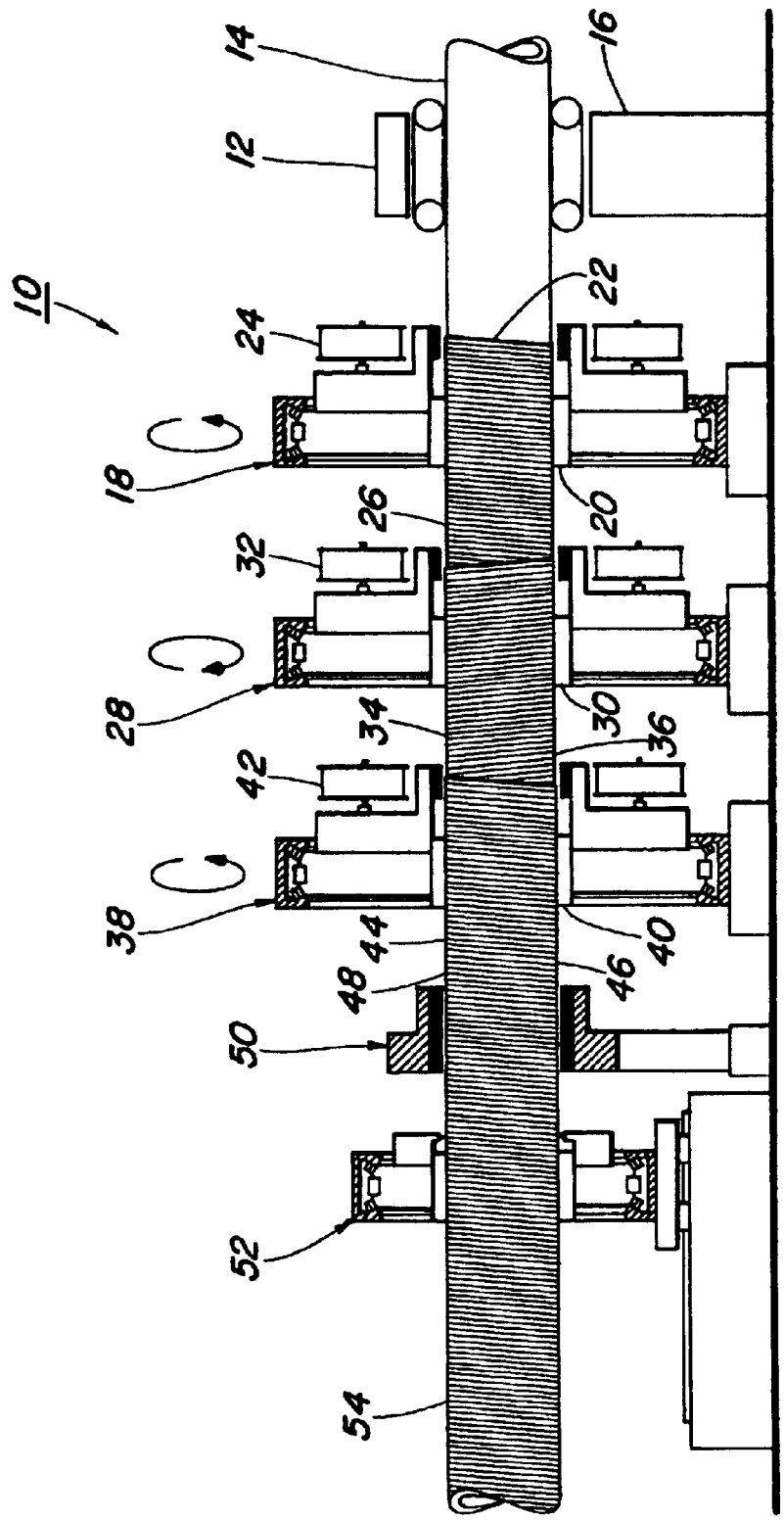
FIG. 1 is a schematic view depicting typical processing equipment which can be employed to continuously fabricate the fiber reinforced thermoplastic pipe member of the present invention.

Referring to the drawings, FIG. 1 is a schematic drawing depicting a representative processing apparatus which can be employed to continuously fabricate the present fiber reinforced thermoplastic pipe member. The depicted equipment means further illustrates the individual process steps being employed for said continuous fabrication according to the present invention. Said combined equipment and process flow chart 10 first utilizes a conventional tractor type feed mechanism 12 to continuously transport the supplied bare thermoplastic pipe length 14 in a horizontal linear direction at constant speed through the depicted apparatus 16. The bare pipe member 14 proceeds in said manner to a first cylindrical winder mechanism 18 which employs a motor driven rotating drum member 20 surrounding the pipe circumference to continuously wrap a first ply of the reinforcement fiber 22 about the outer surface of the moving pipe length. The reinforcement fiber comprises a plurality of the selected continuous length juxtapositioned fibers being supplied from a rotary spool 24 operatively associated with said winder mechanism and which feeds the supplied fiber material at a relatively constant rotational speed. As further shown in the present drawing, said first wrap or ply of the fiber reinforcement has been applied in an unbonded condition at a predetermined spatial angle with respect to the longitudinal axis of the moving pipe length in response to a counterclockwise rotation of drum member 20. While not specifically identified in the present drawing, the particular reinforcement fiber material 22 being applied in the illustrated embodiment consists of continuous length glass filaments embedded in a thermoplastic polymer matrix but still other commercially available prepreg or preformed reinforcement tapes of similar construction are deemed equally suitable for processing in the illustrated apparatus.

The initially fiber wrapped moving pipe length 26 is next transported to a second cylindrical winder mechanism 28 with the same type rotating drum member 30 and rotary spool 32 previously employed for application of a second ply of the same fiber reinforcement 34. In doing so, it can be seen that said fiber reinforcement is now aligned in an unbonded condition at a different predetermined placement angle with respect to the longitudinal axis of the moving pipe length than previously employed and with said placement of the second ply being in response to a clockwise rotation of drum member 30. The now two-ply fiber wrapped pipe length 36 is next further transported to a third cylindrical winder mechanism 38 again having the same rotating drum member 40 and rotary spool 42 where a final ply 44 of protective overwrap 46 such as a thermoplastic film tape is applied over the moving fiber reinforced pipe length to protect the fibers from handling and/or environmental degradation. As can again be noted from the present drawing, said protective overwrap has been applied at a predetermined reverse spatial angle from that employed in the preceding fiber wrap and with drum member 40 rotating again in a counterclockwise direction. It becomes possible in such manner to help improve the overall mechanical strength of the applied fiber reinforcement while still further enabling the protective overwrap to add to the compaction force generated when the fiber reinforcement is thereafter thermally bonded to the pipe member. Said thermal bonding is carried out continuously with the now protected fiber wrapped pipe member 48 being transported to a stationary heating means 50 which again encloses the pipe member while being spaced apart therefrom and which consists of a hollow cylinder provided with suitable internal heating elements of the type hereinbefore disclosed. Passage of the pipe member in the same linear direction at constant speed through the length of said heated chamber in the present apparatus embodiment causes thermal bonding of all wraps on the pipe circumference to become secure to the underlying outer pipe surface and with the individual fiber wraps retaining the applied spatial direction. A movable cut-off mechanism 52 mechanically severs the now completed fiber reinforced thermoplastic pipe member 54 into suitable lengths without interrupting continuous movement of the remaining pipe construction through the illustrated apparatus. Such cut-off operation can be carried out with various known saw or knife devices such as already employed in existing plastic pipe extrusion apparatus. The illustrated traveling cutter could use a knife means including a circular knife if only the reinforced fiber is to be severed whereas a saw device is deemed preferable if an entire fiber reinforced pipe length is desired to be removed from the remaining pipe construction. Additionally, it is contemplated that said traveling cutter mechanism could still further include router, planar, or chamfer means and the like to provide a customized profile at one or more cut-ends of the severed pipe length if desired for a particular end use application.

In FIG. 2 there is shown schematically in block diagram form a representative automated control system for the FIG. 1 processing apparatus. Basically, said control system 60 includes a conventional velocity type servomechanism to regulate the pipe movement and fiber wrapping operations conducted in said apparatus as dictated by an operator activated interface. Identification numerals employed in the present drawing further include the same numerals previously used in the FIG. 1 apparatus description for the purpose of herein denoting the operative association between controlled components of said apparatus and components of the presently illustrated control means. The overall control system 60 herein depicted is of the known master-slave type whereby the tractor feed component 12 operates as the master control component with all cylindrical wrapping components 18, 28 and 38 being slaved thereto. In accordance therewith the velocity or speed ratio between the master and slave servo control means 62 is determined by main control component 64 in the illustrated control system as regulated by settings in the operator interface component 66. Heater control component 68 in the illustrated control system automatically handles all heating requirements while also signaling the main control (64) and operator interface (66) components in the illustrated control system of both process operating conditions and any fault conditions discovered during apparatus operation. Cut-off control 70, if used, is actuated by main control 64 with a setting established through the operator interface component 66. Remaining power control component 72 in the illustrated control system is operated in the conventional manner with settings controlling power input from a customary power supply (not shown) to the illustrated apparatus.

It will be apparent from the foregoing description that a broadly useful and novel means to continuously fabricate a fiber reinforced thermoplastic pipe member in a more effective manner has been provided. It is contemplated that already known modifications can be made in the fiber wrapped pipe member produced in such manner than herein specifically recited as well as process end apparatus modifications being made in carrying out such continuous fabrication procedure. Consequently, it is intended to cover all variation in the disclosed fabrication procedure which may be devised by persons skilled in the art as falling within the true spirit and scope of the herein claimed invention.

What I claim as new and desire to secure by Letters Patent of the United States is:

1. A fiber reinforced pipe member comprising an already formed solid thermoplastic pipe length having an outer wall surface enclosing an inner hollow cavity which includes multiple applied layers of continuous juxtapositioned reinforcement fibers formed with a solid material composition selected from the group consisting of ceramics, metals, carbon, glass compositions and organic polymers which further includes a thermoplastic resin binder, each of said multiple applied layers having been applied successively at a predetermined spatial angle with respect thereto which differs from the spatial angle employed for the immediately preceding applied layer, said reinforcement fibers having been continuously wrapped about the outer surface of the unheated hollow pipe length in an unbonded condition while said pipe length continuously moves without rotation in a linear travel direction with respected thereto, followed by sufficient external heating of the fiber wrapped pipe length thereafter while continuously moving in the same linear travel direction to cause thermal bonding of all applied fibers to the outer wall surface of the underlying hollow pipe length without further melting of said underlying hollow pipe length.

2. The fiber reinforced pipe length of claim 1 wherein the pipe reinforcement fibers are wrapped in the hoop direction.

3. The fiber reinforced pipe length of claim 1 wherein the pipe length has a cylindrical configuration.

4. A plurality of identical fiber reinforced pipe lengths joined together prior to reinforcement at the ends and each comprising a solid thermoplastic organic polymer member having an outer wall surface enclosing an inner hollow cavity which includes multiple applied layers of continuous juxtapositioned reinforcement fibers formed with a solid material composition selected from the group consisting of ceramics, metals, carbon, glass compositions and organic polymers which further includes a thermoplastic resin binder, each of said multiple applied layers having been applied successively at a predetermined spatial angle with respect thereto which differs from the spatial angle employed for the immediately preceding applied layer, said reinforcement fibers having been continuously wrapped about the outer surface of the unheated hollow pipe lengths in an unbonded condition while said joined pipe lengths continuously move without rotation in a linear travel direction with respect thereto, followed by sufficient external heating of the fiber wrapped pipe lengths thereafter while continuously moving in the sane linear travel direction to cause thermal bonding of all applied fibers to the outer wall surface of the underlying joined pipe lengths without further melting of said underlying hollow pipe lengths.

5. The fiber reinforced pipe lengths of claim 4 wherein the individual fiber wraps are aligned in the hoop direction.

\* \* \* \* \*